United States Patent [19]
Young, Jr.

[11] Patent Number: 5,922,364
[45] Date of Patent: Jul. 13, 1999

[54] STEREOLITHOGRAPHY LAYERING CONTROL SYSTEM

[76] Inventor: Albert C. Young, Jr., 7621 Shreve Rd., Falls Church, Va. 22042

[21] Appl. No.: 08/810,285

[22] Filed: Mar. 3, 1997

[51] Int. Cl.⁶ .............................. B29C 35/08; B29C 41/02
[52] U.S. Cl. ........................................ 425/174.4; 264/401
[58] Field of Search .......................... 425/174.4; 264/401

[56] References Cited

U.S. PATENT DOCUMENTS

| | | | |
|---|---|---|---|
| 5,248,249 | 9/1993 | Yamamoto et al. | 425/174.4 |
| 5,263,130 | 11/1993 | Pomerantz et al. | 264/401 |
| 5,474,719 | 12/1995 | Fan et al. | 264/401 |
| 5,626,919 | 5/1997 | Chapman et al. | 425/174.4 |
| 5,647,931 | 7/1997 | Retallick et al. | 425/174.4 |
| 5,665,401 | 9/1997 | Serbin et al. | 425/174.4 |
| 5,667,820 | 9/1997 | Heller et al. | 425/174.4 |

Primary Examiner—Robert Davis
Attorney, Agent, or Firm—Neil F. Markva

[57] ABSTRACT

An apparatus and method for depositing a layer of liquid medium along an upper surface of a liquid medium bath. A first reserve supply volume projecting upwardly from said surface and a continuous sheet of discharged liquid medium are provided above a working zone along said surface. The discharged liquid medium sheet is substantially uniformly deposited to produce a continuous supply of liquid medium and to add liquid medium to the first reserve supply volume as the continuous sheet moves along the upper bath surface. A liquid medium layer having a preselected thickness is formed with liquid medium flowing from said first reserve supply volume of liquid medium. An applicator assembly includes an applicator device and a pumping assembly to produce the reserve supply volume from a liquid medium bath.

20 Claims, 6 Drawing Sheets

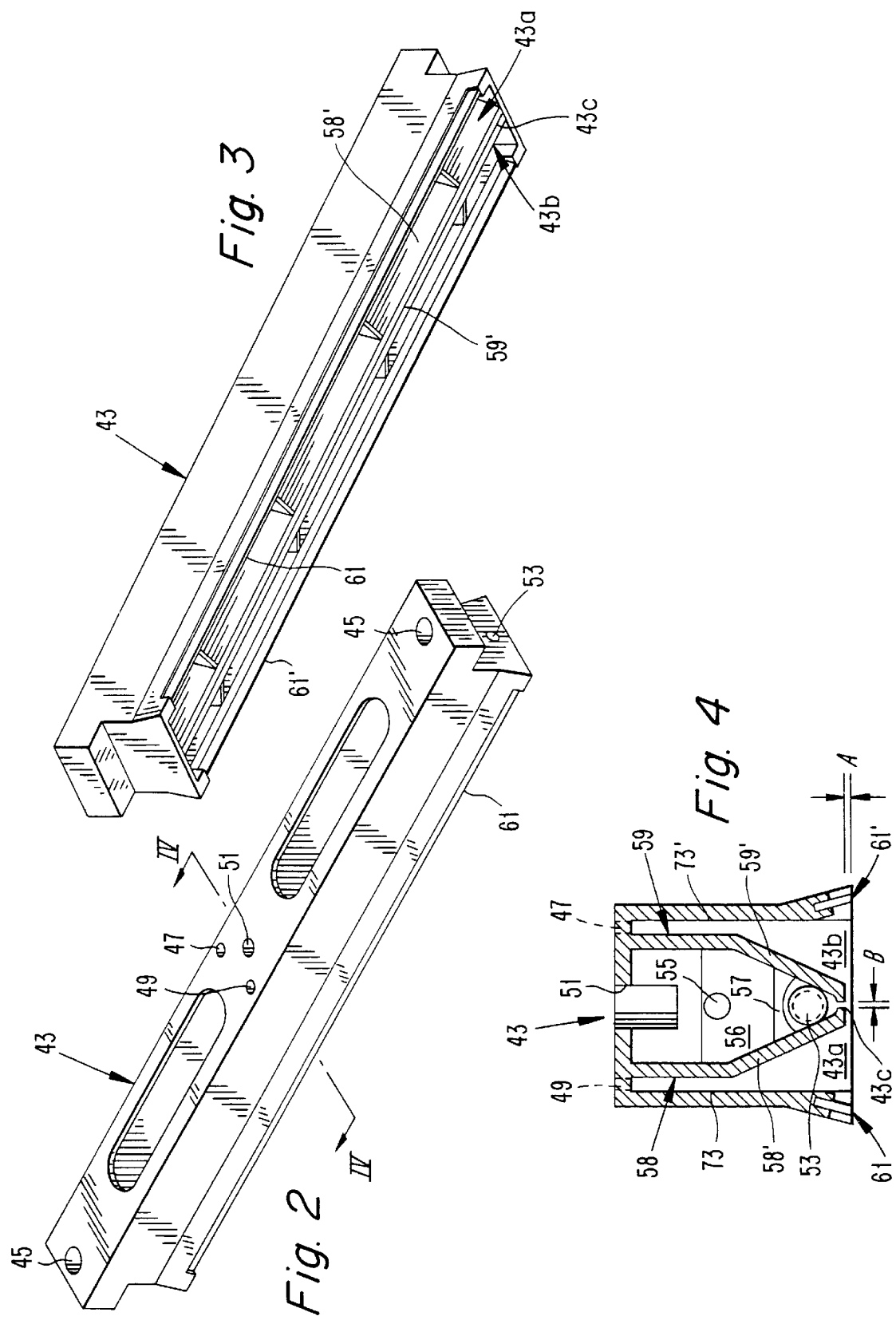

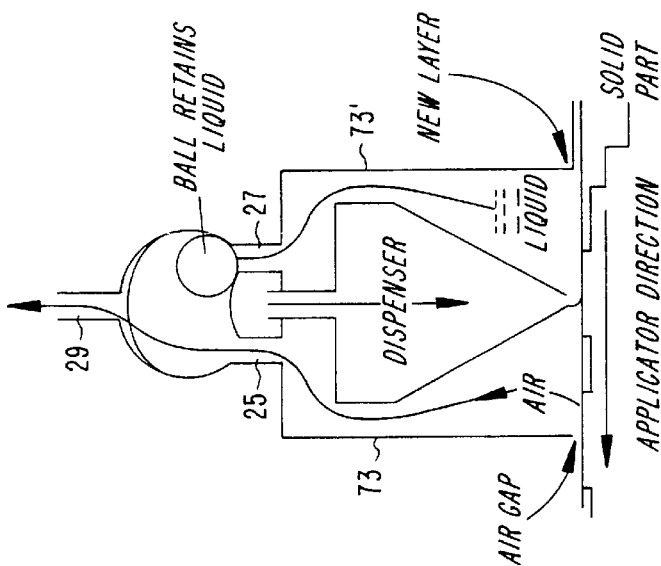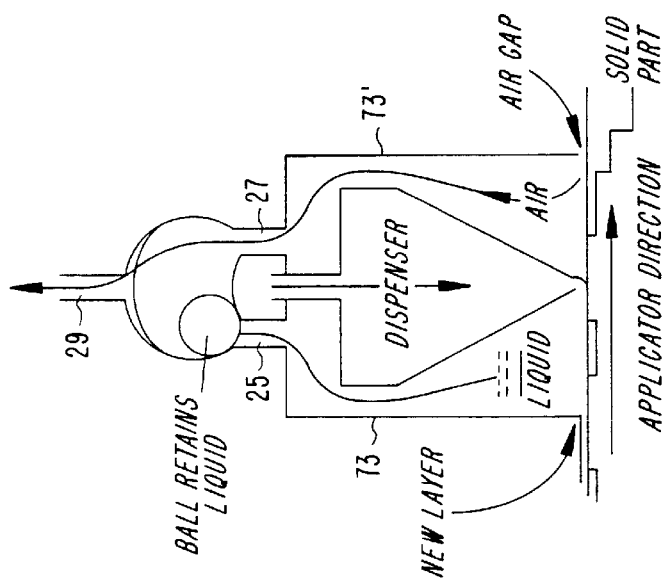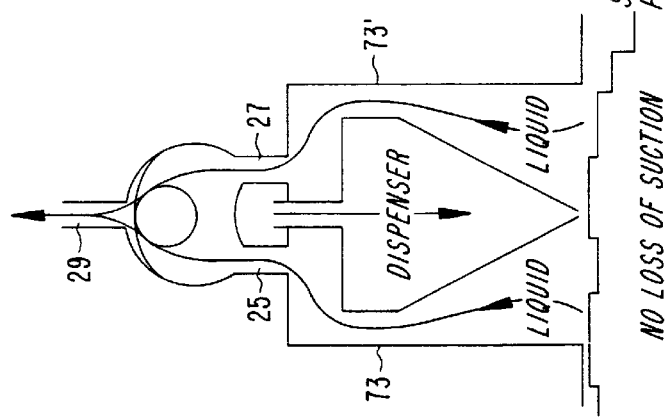

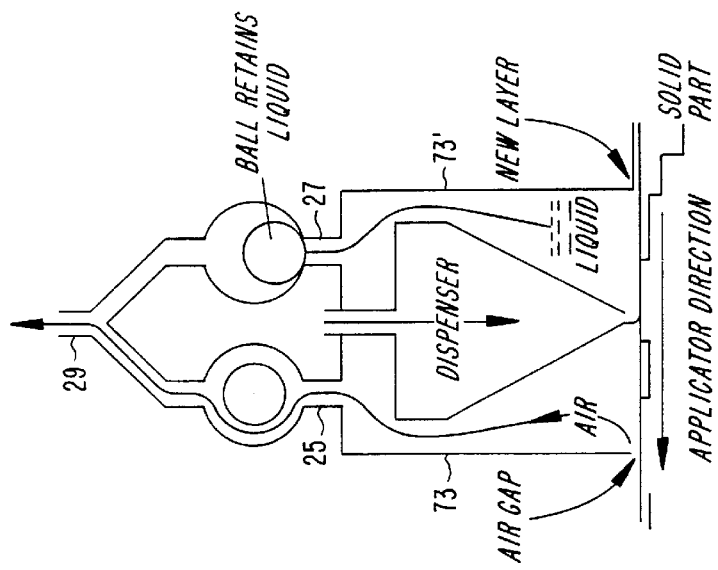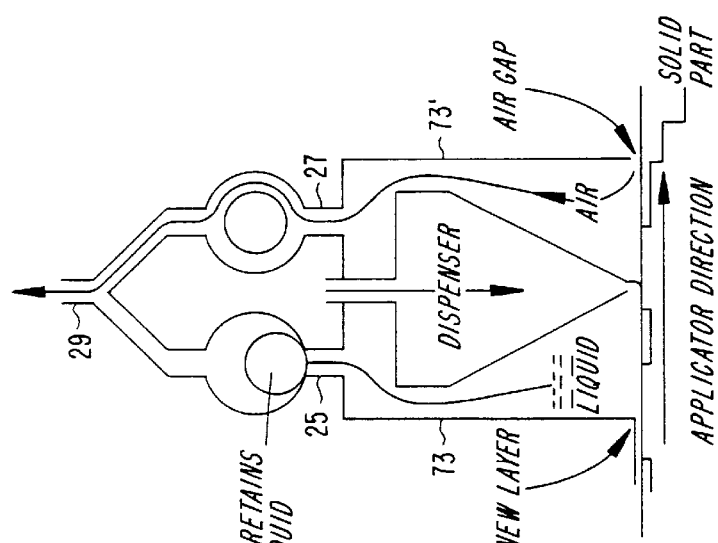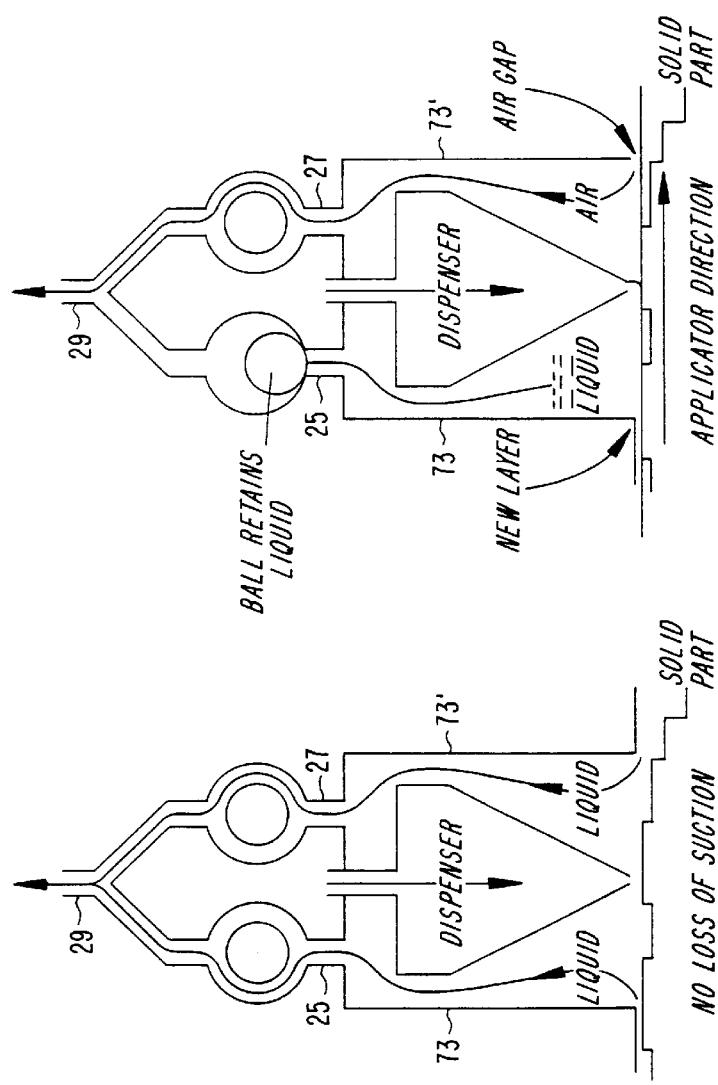

STEREOLITHOGRAPHY LAYERING CONTROL SYSTEM

FIELD OF THE INVENTION

This invention relates to the production of three-dimensional objects by stereolithography. More particularly, the invention relates to control systems for producing successive contiguous layers to form a three-dimensional object on a workpiece support surface.

BACKGROUND OF THE INVENTION

Forming three-dimensional objects by photochemical hardening of successive contiguous layers on a workpiece support surface within a liquid resin bath disposed in a vessel has been known for more than 40 years. The commercialization of this relatively old concept has produced numerous patents as computer technology has developed to maintain the precision required to make the stereolithograghic process efficient enough to effect commercial production of three-dimensional articles.

From the outset as early as 1956, the need for precision control of the amount of photohardenable liquid being disposed over the next previous layer of hardened polymer material was recognized. The industry thus developed equipment and methods for controlling the known parameters for producing each successive layer in the required series to form the three-dimensional object. The known parameters for the liquid medium layer formation process include maintaining the liquid resin level within the resin vat and controlling the application and layer thickness of the liquid layer medium to be selectively hardened to form the desired cross-sectional slice of the article being formed.

Many systems for production of three-dimensional modeling by photoforming are known. European Patent Application No. 250,121, filed by Scitex Corporation Ltd., on Jun. 6, 1987, discloses a three-dimensional modeling apparatus using a solidifiable liquid, and provides a good summary of documents pertinent to this art. U.S. Pat. No. 4,575,330, issued to C. W. Hull on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction. Successive adjacent laminae or layers, representing corresponding successive adjacent cross-sections of the object, are automatically formed and integrated together to provide a step-wise laminar buildup of the desired object whereby a three-dimensional object is formed end drawn from a substantially planar surface of the fluid medium during the forming process.

U.S. Pat. No. 4,752,498, issued to E. V. Fudim on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking so that when a subsequent layer is formed it will adhere thereto. Using this method, multilayer objects can be made.

A publication entitled "Solid Object Generation" by Alan J. Herbert, Journal of Applied Photographic Engineering, 8(4), 185–188, August 1982, describes an apparatus which can produce a replica of a solid or three-dimensional object much as a photocopier is capable of performing the same task for a two-dimensional object. The apparatus is capable of generating, in photopolymer, a simple three-dimensional object from information stored in computer memory. A good review of the different methods is also given by a more recent publication entitled "A Review of 3D Solid Object Generation" by A. J. Herbert, Journal of Imaging Technology 15:186–190 (1989).

Most of these approaches relate to the formation of solid sectors of three-dimensional objects in steps by sequential irradiation of areas or volumes sought to be solidified. Various masking techniques are describe as well as the use of direct laser writing, that is, exposing a photoformable composition with a laser beam according to a desired pattern and building a three-dimensional model, layer by layer. In addition to various exposure techniques, several methods of creating thin liquid layers are described which allow both coating a platform initially and coating successive layers previously exposed and solidified.

The foregoing prior art methods of coating are not capable of ensuring flat uniform layer thickness or of producing such layers quickly, however. They do not effectively prevent damage or distortion to previously formed layers during the successive coating process and they involve coating only liquid formulations of preferably low viscosity. Furthermore, they do not recognize very important parameters involved in the coating process such as the effects of having both solid and liquid regions present during the formulation of the thin liquid layers, the effects of fluid flow and rheological characteristics of the liquid, the tendency for thin photoformed layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example, describes an over-dipping process where a platform is dipped below the distance of one layer in a vat, then brought up to within one layer thickness of the surface of the photoformable liquid. Hull further suggests that low viscosity liquids are preferable but, for other practical reason, the photoformable liquids are generally high viscosity liquids. Motion of the platform and parts, which have cantilevered or beam regions (unsupported in the Z direction by previous layer sections) within the liquid, creates deflections in the layers, contributing to a lack of tolerance in the finished part. In addition, this method is rather slow.

U.S. Pat. No. 2,775,758, issued to O. J. Munz on Dec. 25, 1956 and the Scitex application describe methods by which the photoformable liquid is introduced into a vat by means of a pump or similar apparatus such that the new liquid level surface forms in one layer thickness over the previously exposed layers. Such methods have the aforementioned disadvantages of the Hull method except that the deflection of the layers during coating is reduced.

Munz calls his stereolithographic system, a photo-glyph recording system. The patent discloses a liquid photographic formulation that is self-developing, self-fixing and solidifying because it is photo-hardenable on exposure to light. Any conventional photo-sensitive material such as the photopolymer disclosed in the 1945 British Patent 566,975 may be used in the Munz patented process and apparatus.

Munz uses a vessel containing a bath of liquid photohardenable material in which the bath surface is maintained at a constant distance from the light source by replenishing the photohardenable material as required when the bottom of the bath necessarily moves downwardly as successive layers are formed to produce the desired three-dimensional object. A workpiece support surface is mounted to move downwardly during the layer forming procedure by a distance coordinated with the amount of liquid discharged from the liquid supply source. The distance moved and amount of liquid added must be precisely coordinated to form the thin layer over the support surface to be exposed to a preselected design of light rays. Otherwise the desired solidified layer of hardened formulation would be inoperative. Through a succession of the disclosed steps, a plurality of exposed transparent film layers are successively stacked in response to the light phenomena recorded for exposing the successive photographic layer. The general concepts used in all stereolithography processes are thus in the public domain.

The patent issued to Fudim describes the use of a transmitting material to fix the surface of a photopolymer liquid to a desired shape, assumably flat, through which photopolymers of desired thickness are solidified. The transmitting material is usually rigid and either coated or inherently nonadherent to the solidified photopolymer. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface.

The methods using doctor blades and/or material supply mechanisms shown in Japanese Patent Application Publication Kokai Nos. 61-114817, 61-114818, and 61-116322 require an exact amount of material or photoformable composition to be added in the vessel every time a layer has to be formed. Also, they require the doctor blade or smoothening blade to have a length equal to the width of the vessel in order to properly operate. Because of this, the systems described in these patents have restrictions necessarily confining the photo-sensitive material between the doctor blade and part of the vessel at all times. Thus, it becomes very difficult to form a uniform layer in one continuous pass of the doctor blade without ending up with an excess or shortage of material at the end of the pass. In other words, the doctored layer may be either lacking a part of it at the end of one doctoring operation or it may have an excess of material, which will be very difficult to redistribute in order to achieve the proper thickness and uniformity, due to the confined nature of the arrangement. Also, the doctoring blade has a tendency to create wave motion in the material surrounding the previously exposed layer causing a disturbing effect, particularly on parts of the previously exposed layer which are partially unsupported.

U.S. Pat. No. 3,428,503 discloses a three-dimensional reproduction method comprising the successive masking and etching away of material from a block. The block is coated with successive layers of photo-sensitive resist material used to prepare the block for etching away each layer with a liquid etching fluid disposed in a vat. In effect, patent '503 discloses a method for removing a successive number of contiguous layers of material that produces a mirror image of the Munz three-dimensional object. The resultant cavity thus formed in the block is then used to produce a casting.

An article entitled "Automatic Method for Fabricating a Three-Dimensional Plastic Model with Photo-hardening Polymer" by Hideo Kodama, Rev. Sci. Instrum. 52(11), 1770–1773, November 1981, discloses a method for forming a three-dimensional model by stacking cross-sectional layers formed within a bath of liquid photo-hardenable polymer that is selectively exposed to ultraviolet rays. The computer-controlled layer formation is automatic. Three-dimensional cross-sectional shapes stored in the computer determine the selected shape of the area to be exposed to the ultraviolet rays. The liquid polymer level in the vat is automatically adjusted as the workpiece support surface is moved upwardly or downwardly depending on whether the direction of the ultraviolet light exposure is from the top or bottom of the polymer-containing vessel.

In another Kodama embodiment, a scanning fiber transmitter mounted on an x-y plotter directs the ultraviolet rays to the surface of the resin being exposed in the pattern of the cross-section of the object being formed in the liquid polymer bath. The support surface is intermittently immersed in steps to automatically maintain a constant distance between the light source and top surface of the bath upon solidification of each successive layer. The Kodama system shows the making of complex three-dimensional shapes including the formation of an adequately cohesive layer of structure capable of being partially unsupported by any other layer of structure during formation.

Stereolithography Layering Control System

The Japanese Patent Application Publications Kokai Nos. 61-114817 and 61-114818 disclose systems for preparing a smooth surface of photo-setting resin material to form stereo shapes by applying laser beam irradiation. A smoothing plate has a length corresponding to either one of the widths of the container holding the resin. The smoothing plate is moved in the direction intersecting horizontally with its length direction to the photo-setting resin material in liquid form supplied in a container for accommodating resin from the resin supply opening on the container for providing a resin laid layer of uniform thickness having a smooth surface. More specifically, dispensing means supplies the photo-setting resin material onto the photo-setting resin surface in the predetermined direction from an elongate opening with a preset width. In publication 61-114817, a resin material supply mechanism includes an elongate supply opening in the laser beam primary scanning direction to the surface of the photo-setting resin material in the resin vat. A supply of a preset amount of the photo-setting material is discharged from the elongate supply opening and an irradiating beam follows the disposition of the resin from the elongate opening and effects the selective hardening of the photo-sensitive resin.

In publication 61-114818, liquid resin is applied to the top of the platform in excess and a squeegee or doctor blade having a length corresponding to the width of the container intersects with the supplied resin while moving across the working surface to smooth the supply of material disposed in front of the smoothing blade. That is, the resin material disposed in excess on the top of the layer or platform surface is smoothed into a layer of predetermined thickness by a smoothing plate or blade with the exposure being made immediately following the movement of the smoothing blade across the surface of the vat. The laser beam and the smoothing plate are moved substantially simultaneously in parallel across the vat. Neither of these disclosures show a particular manner in which the resin is disposed along a layer disposed zone to maintain any uniformity of resin volume in front of the elongated blade or plate being used to smooth the layer in which the cross-sectional slice of the three-dimensional object is to be formed.

U.S. Pat. Nos. 5,174,931 and 5,258,146 disclose the use of a doctor blade to move horizontally across the upper surface of the bath after an excess of viscous fluid is placed on a platform having a surface which supports a three-dimensional object being formed. The lower edge of the doctor blades strikes off the excess of polymerizable liquid from a layer that has been first formed by dipping the platform into the bath and then raising the platform above the bath. The doctor blade smoothes the upper surface of the coating over the layer being deposited onto the platform surface or last previous layer formed in the overall process. The velocities of the blade across the liquid body are empirically determined to provide a desired layer across the upper surface in the same fashion as in the Japanese publications 61-114817 and 61-114818. The patentees state that one or more passes of the doctor blade may be needed at a particular speed to provide a smooth level upper surface. After the upper surface of the layer is leveled by the doctor blade, the object and support platform are lowered into the bath so that the smooth upper surface of the layer is level with or in the same horizontal plane as the surface of the bath.

Another known system for photo-hardening liquid medium in any stereolithography system is used by 3D Systems in a specially designed recoating blade applies resin to the previously layered as the blade passes over the part. Laterally spaced wall members having bottom straight edged portions are placed in the bath of liquid medium. A vacuum is then formed between the wall sections to draw liquid medium upwardly a measured distance within the space between the wall sections. Once the part is lowered one layered thickness within the bath, the recoating assembly is passed over a layered depositing zone over the previously formed layer. The basic problem with this known structure, however, is that as the leading wall section passes over the previously formed layer which is disposed downwardly from the recoating assembly, the liquid between the wall sections is released and the vacuum is lost. This is particularly true on large cross-sectional pieces being formed.

Purpose of the Invention

An object of the present invention to provide an apparatus and a method for fabricating an integral three-dimensional object from a multiplicity of cross-sectional slices of the article being formed, wherein a plurality of successively hardened contiguous layers of photoformable liquid composition are formed in a layer depositing zone in a fast and uniform manner.

Another object of the present invention is to provide a method of raising a reserve supply volume of the photoformable composition above the surface of said composition and in front of the layer forming blade means.

A further object of the invention is to use a pump to recirculate a liquid of the nature used in stereolithography or solid imaging of three-dimensional articles while avoiding the problem of the viscosity of the liquid medium and sensitivity of such composition that causes blockage of the paths and seizure of the pumping operation and premature polymerization within a pump.

Another object of the invention is to overcome the basic deficiencies related to the prior art layer control systems as discussed above.

SUMMARY OF THE INVENTION

The assembly is directed to an applicator assembly for depositing a layer of fluid medium along a surface. The assembly comprises means for providing a continuous sheet of discharged fluid medium above a working surface, and means for substantially uniformly depositing the discharged fluid medium sheet along the working surface. The substantially uniformly depositing means includes gravity feed means for producing a discharged fluid medium sheet along the working surface, and the continuous sheet providing means includes dispensing chamber means for containing a dispensing reservoir of fluid medium, and metering means for directing a substantially uniform discharge supply of fluid medium from the dispensing chamber to the feed means which forms the discharged fluid medium sheet with a continuous extended width. More particularly, the gravity feed means includes elongated discharge slot means for directing a metered amount of fluid medium from a distance above the working surface that is effective to maintain the fluid medium sheet with a continuous extended width from the slot means to the working surface. An elongated housing means has a longitudinal axis and a length sufficient to extend across a layer depositing zone defined along the working surface. The elongated discharge slot means that extends the length of the housing means to discharge the fluid medium sheet across the layer depositing zone.

A feature of the assembly includes elongated housing means having a longitudinal axis extending along a length sufficient to reach across a layer depositing zone defined along the working surface. The gravity feed means includes elongated discharge slot means for directing a metered amount of fluid medium from a distance above the working surface. The discharging distance is effective to maintain the fluid medium sheet with a continuous extended width from the slot means to the working surface. Housing drive means is effective to move the housing means in a direction transverse to the longitudinal axis and to maintain movement of the housing means at a velocity effective to provide from the discharged fluid medium sheet a substantially uniform thickness of the fluid medium across the layer depositing zone. More specifically, the continuous sheet providing means includes metering means and dispensing chamber means for containing a dispensing reservoir of the fluid medium. The metering means is effective to direct the metered amount of fluid medium from the dispensing chamber through the discharge slot means to form the discharged fluid medium sheet with a continuous elongated width. And in a specific embodiment, the assembly includes means for mounting housing means to move across a vat containing a bath of photohardenable liquid medium of a stereolithographic system for rapidforming a three-dimensional object with photohardening means to selectively harden each successive deposited layer to form a solidified cross-section of the object being formed. The gravity feed means is effective to successively deposit on object support means a substantially uniform layer of the liquid medium each time the housing means moves across an object building zone within the bath.

The invention includes a method for depositing a layer of liquid medium along a surface. The method comprises providing a first reserve supply volume projecting upwardly from the surface and a continuous sheet of discharged liquid medium above a working zone along the surface. The discharged liquid medium sheet is substantially uniformly deposited along the working surface to produce a continuous supply of liquid medium and to add liquid medium to the first reserve supply volume as the continuous sheet moves along the upper bath surface. A liquid medium layer having a preselected thickness is formed from the first reserve supply volume of liquid medium. The viscosity of the liquid medium in the bath is maintained substantially constant by controlling the temperature of the liquid medium bath.

In a specific embodiment of the method, the continuous sheet providing step includes furnishing a liquid medium dispensing chamber, a bath of the liquid medium having an upper surface, pumping means for directing liquid medium from the upper surface of the liquid medium bath into the liquid medium dispensing chamber, slot feed means having an elongated length and being disposed at a location upwardly spaced from a liquid layer depositing surface for discharging liquid medium from the liquid medium dispensing chamber, and metering means for directing a substantially uniform discharge supply of liquid medium from the dispensing chamber to the slot means to form a discharged liquid medium sheet with a continuous extended width. The liquid medium sheet depositing step includes moving the slot feed means in a direction transverse to the elongated length while discharging liquid medium from the dispensing chamber to deposit a substantially uniform amount of liquid medium across the liquid layer depositing surface. Elongated blade means is mounted to move across the liquid layer depositing surface at a laterally spaced distance behind the slot feed means. The blade means has a lower straight edge located in a plane that is downwardly spaced from the slot feed means and upwardly spaced a preselected distance from the liquid layer depositing surface. The slot feed means and blade means are moved in tandem across the liquid layer depositing surface while discharging liquid medium from the dispensing chamber. The desired liquid medium layer having a preselected thickness substantially equal to the preselected distance is formed between the lower blade edge and the liquid layer depositing surface.

More particularly, the pumping means directs liquid medium from the upper surface of the liquid medium bath into the liquid medium dispensing chamber and dispensing means discharges liquid medium from the liquid medium dispensing chamber to return liquid medium to the bath. A recirculating flow of liquid medium is maintained from the liquid medium bath to the liquid medium dispensing chamber for return to the bath.

Another feature of the invention is directed to an assembly for depositing a layer of liquid medium along a surface. The assembly comprises means for providing a continuous sheet of discharged liquid medium above a liquid medium depositing surface and pumping means to direct liquid medium from a first reserve volume supply to said continuous sheet providing means. The discharged liquid medium sheet is deposited along the liquid medium depositing surface to provide a continuous flow of liquid medium to the liquid medium reserve volume supply and the liquid medium layer having a preselected thickness is formed from liquid medium in the liquid medium reserve volume supply. More specifically, the assembly includes a vat containing a bath of photohardenable liquid medium having a top surface disposed at a predetermined level, liquid medium dispensing chamber means disposed above the predetermined level of the top surface, temperature control means for maintaining the viscosity of the liquid medium substantially constant, and bath replenishing means for maintaining the top surface at the predetermined level after liquid medium has been removed from the bath and placed in the dispensing chamber means.

In a specific embodiment, liquid medium dispensing chamber means contains a predetermined dispensing amount of liquid medium, vat means contains a bath of the liquid medium having a top surface, pumping means directs liquid medium from the top surface of the liquid medium bath into the dispensing chamber means, slot feed means having an elongated length is disposed at a location upwardly spaced from a liquid layer depositing surface for discharging liquid medium from the liquid medium dispensing chamber means, and metering means for directs a discharge supply of liquid medium from the dispensing chamber to the slot means to form a discharged liquid medium sheet with a continuous extended width. Drive means moves the slot feed means in a direction transverse to the elongated length while discharging liquid medium from the dispensing chamber means to deposit a substantially uniform amount of liquid medium across the liquid layer depositing surface. An elongated blade means is mounted to move across the liquid layer depositing surface at a laterally spaced distance behind the slot feed means with the reserve volume supply therebetween. The blade means has a lower straight edge located in a plane that is downwardly spaced from the slot feed means and upwardly spaced a preselected distance from the liquid layer depositing surface. The blade means is mounted to move in tandem with the slot feed means across the liquid layer depositing surface while discharging liquid medium from the dispensing chamber means. The blade means forms the liquid medium layer having a preselected thickness substantially equal to the preselected distance between the lower straight edge and the liquid layer depositing surface. Liquid medium from the reserve volume supply is used to form the desired layer. A recirculating flow of liquid medium is produced from the liquid medium bath to the liquid medium dispensing chamber returning liquid medium to the bath. Overflow means maintains a maximum level of liquid material in the dispensing chamber.

The stereolithography system of the invention effects rapidforming of a three-dimensional object by successively depositing a plurality of contiguously disposed layers of photohardenable liquid medium along a layer depositing zone wherein a cross-sectional slice of the object is selectively hardened in each successive layer to build the desired object. The system comprises a vat containing a bath of photohardenable liquid medium having an upper surface extending across the vat and platform means mounted in the vat to provide surface means for supporting the object being formed within the layer depositing zone. Reservoir means provides above the bath a reserve supply of the liquid medium for forming each successive layer. Liquid medium furnishing means directs liquid medium into the reserve supply of the reservoir means that includes containing means which provides a first reserve supply volume projecting upwardly from the upper surface. Feed means delivers a second reserve supply volume to the bath from a location upwardly spaced from the upper surface. Drive means moves the reservoir means across the upper surface of the liquid medium bath and layer forming means is mounted to the reservoir means and upwardly spaced from the platform means by an amount sufficient to produce each successive layer when the drive means moves the reservoir means across the layer depositing zone. Photo energy means selectively hardens each successive layer of the liquid medium deposited from the reserve supply to form a solidified cross-section of the object being formed.

More specifically, the first reserve supply volume defines a following supply sector located to the rear of the feed means to supply liquid medium for forming a layer having a predetermined thickness within the layer depositing zone when the drive means moves the reservoir means in a lineal direction across the upper surface of the liquid medium bath. The first reserve supply volume also defines a forward supply sector located ahead of the feed means when the reservoir means moves in the lineal direction. In other words, the first reserve supply volume includes a first volume supply sector located on one side of the feed means and a second volume supply sector located on the other side of the feed means. One of the volume supply sectors is ahead of the feed means and the other volume supply sector is behind the feed means when the drive means moves the reservoir means in a lineal direction across the upper surface of the liquid medium bath.

In a specific embodiment, the liquid medium furnishing means includes fluid passageway means and pump means for directing liquid medium from the liquid medium bath through the fluid passageway means into the first and second reserve supply volumes. The first reserve supply volume includes a first volume supply sector located on one side of the feed means and a second volume supply sector located on the other side of the feed means. When the drive means moves the reservoir means in a lineal direction across the upper surface of the liquid medium bath, one of the volume supply sectors constitutes a leading volume supply sector located ahead of the feed means and the other the volume supply sector constitutes a following volume supply sector located behind the feed means. Valve means located in the fluid passageway means for controlling the flow of liquid between the first and second volume supply sectors and the second reserve supply volume.

More particularly, the valve means is effective to allow the pump means to draw air through the leading volume supply sector when the leading volume supply sector passes over the last previously hardened cross-sectional slice formed in the layer depositing zone. The valve means is further effective to hold liquid medium in the following volume supply sector when the pump means draws air through the leading volume supply sector. Two valve inlet openings are defined by respective inlet opening structures, a single valve outlet opening is defined by an outlet opening structure, and closure means controls fluid medium flow through the valve means into the two inlet openings and out the single outlet opening to the pump means, which directs liquid medium through the fluid passageway means into the second reserve supply volume.

More specifically, the closure means includes valve element means disposed to operate between an open position and a closed position with respect to each of the valve inlet openings. The valve element is being effective to maintain the inlet and outlet openings in an open position when liquid medium is directed though the valve means and effective to close the inlet opening to hold the following volume supply sector in place when air is directed through the other of the inlet openings connected to the leading volume supply sector.

In one embodiment, the closure means includes a single ball element and means to keep the ball element in a floating position away from the inlet and outlet openings when liquid medium is directed through the valve means but in a closed position over one of the inlet openings connected to the following volume supply sector when air is directed through the other of the inlet openings connected to the leading volume supply sector. In another embodiment, the valve element means includes a separate ball element mounted to float between the open position and the closed position in each of the inlet opening structures.

Another feature of the invention is directed to a novel liquid medium applicator assembly used in a stereolithography system for rapidforming a three-dimensional object by successively depositing a plurality of contiguously disposed layers along a layer depositing zone wherein a cross-sectional slice of the object is formed in each layer to build the desired object. The system includes a vat containing a bath of liquid medium having an upper surface extending across the vat and being hardenable upon exposure to photo-energy. Platform means in the vat supports the object being formed in the vat, and photoenergy providing means selectively hardens each successive deposited layer to form a solidified cross-section of the object.

The liquid medium applicator assembly comprises housing means including reservoir means for providing a liquid medium reserve supply above the upper surface of the liquid medium bath. The reservoir means includes containing means providing a first reserve supply volume projecting upwardly from the upper surface and dispensing means for delivering a second reserve supply volume to the bath from a location upwardly spaced from the upper surface. Drive means moves the reservoir means across the upper surface of the liquid medium bath and layer forming means is mounted to the reservoir means and upwardly spaced from the platform means an amount sufficient to produce each successive layer from the first reserve supply volume when the drive means moves the reservoir means across the layer depositing zone. The discharge means includes gravity feed means and metering means for directing a substantially uniform discharge supply of liquid medium from the dispensing chamber means to the feed means.

More particularly, the dispensing means includes dispensing chamber means for holding the second reserve supply volume, and discharge means for dispensing a substantially uniform discharge supply of liquid medium from the dispensing chamber means. The containing means includes downwardly extending solid barrier means for defining the first reserve supply volume between the barrier means and the dispensing chamber means. The layer forming means includes a straight edge section located at the bottom of the barrier means and reaching across the layer depositing zone and being upwardly spaced from the platform means to deposit a liquid medium layer from the first reserve supply volume over the layer depositing zone. The solid barrier means includes a downwardly extending barrier wall laterally disposed on each side of the dispensing chamber means. The first reserve supply volume includes a first volume supply sector located on one side of the discharge means between a first barrier wall and the dispensing chamber means and a second volume supply sector located on the other side of the discharge means between a second barrier wall and the dispensing chamber means. One of the volume supply sectors being a leading supply sector located ahead of the discharge means and the other the volume supply sector being a following supply sector located behind the discharge means when the drive means moves the reservoir means in a lineal direction across the upper surface of the liquid medium bath. The discharge means is effective to substantially uniformly deposit a sheet of liquid medium along the layer depositing zone to produce a continuous supply of liquid medium which flows from the second reserve supply volume. And the bottom straight edge section forms each the layer from the following supply sector. Liquid medium furnishing means directs liquid medium from the first reserve supply volume to the second reserve supply volume. Pump means directs liquid medium from liquid medium bath through fluid passageway means into the first and second reserve supply volumes.

In a specific embodiment, the dispensing chamber means includes two downwardly directed wall sections laterally spaced from each other and having two converging bottom wall portions with the discharge means located between the bottom wall portions. The first reserve supply volume includes a following volume supply sector located to the rear of the dispensing chamber means to supply liquid medium for forming a layer having a predetermined thickness within the layer depositing zone when drive means moves the reservoir means in a lineal direction across the upper surface of the liquid medium bath. The first reserve supply volume also includes a forward volume supply sector located ahead of the discharge means when the reservoir means moves in the lineal direction. The second reserve supply volume being located between the two downwardly directed wall sections. More particularly, the discharge means includes an elongated threaded rod member disposed between the converging bottom wall portions to direct a metered amount of liquid medium to discharge outlet means located at the distal end of the bottom wall portions.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 2 is an upper perspective view showing the top of an applicator device made in accordance of this invention.

FIG. 3 is a lower perspective view showing the bottom of the device of FIG. 2.

FIG. 4 is a sectional view along line IV—IV of FIG. 2.

FIGS. 6A, 6B, an 6C are schematic drawings that show the operation of an applicator device of the invention with a fluid control valve having a single valve member.

FIGS. 7A, 7B, and 7C are schematic drawings that show the operation of an applicator device of the invention with a liquid control valve having two operating members.

DETAILED DESCRIPTION OF THE INVENTION

The present invention is directed to a solid imaging method and apparatus for fabricating an integral three-dimensional object from a multiplicity of cross sectional portions of the object. More particularly, the cross sectional portions correspond to solidified portions of contiguous layers of photoformable composition. The method and apparatus use a liquid medium applicator assembly, which forms a layer of liquid photoformable composition over the free surface of a working surface by producing a uniform liquid layer from a reserve volume supply disposed behind a flow of liquid composition discharged from a novel dispensing device.

U.S. Pat. Nos. 4,942,060; 5,051,334; 5,094,935; and 5,248,249 disclose compositions and apparatus with which the applicator assembly of this invention may be used and the disclosures of these four U.S. patents are each incorporated herein by reference in its entirety.

Figure 1:
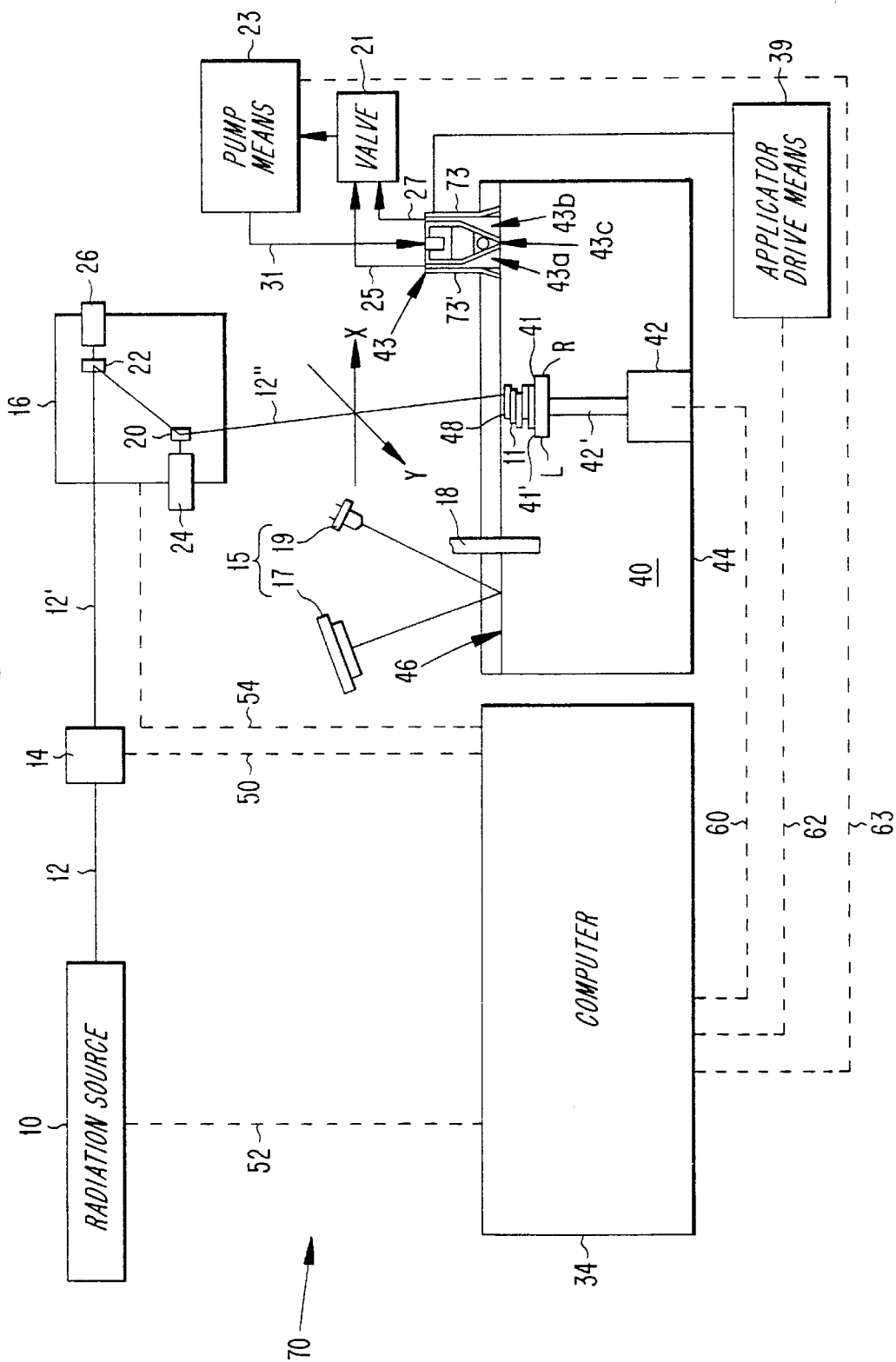
FIG. 1 is a diagrammatic view of a system of a stereolithography system including the applicator assembly of the invention.

FIG. 1 shows an imaging station or stereolithography system 70 including a radiation source 10, a modulator 14, a computer 34, a deflection means 16, preferably in the form of a scanner, and a coating station 71. Radiation source 10 is a laser that produces a radiation beam 12. To produce solid objects at high speed, imaging station 70 uses relatively high power lasers, which may have major bands in the visible, infrared, or ultraviolet regions. For present photospeeds of photoformable compositions, high power is considered to be a power greater than 20 mW, and preferable over 100 mW, as measured from the intensity of the radiation beam 12. As faster compositions become available, however, the values of 20 mW and 100 mW for the beam intensity will become lower accordingly because photospeed of the composition and intensity of the radiation beam have an inverse relation to each other in order to achieve the same results. The selection of a certain type of laser should be coordinated with the selection of the photoformable composition so that the sensitivity of the photoformable composition agrees reasonably well with the wavelength of the laser's emission.

Other types of radiation means such as electron beam, x-rays, and the like may be used, as long as their energy type is matched with the sensitivity of the photoformable composition, a beam is provided, and the appropriate conditions for their handling are observed according to established ways known in the art. Means may be provided to modify the shape of the beam cross-section to any desirable shape. And the profile of the intensity of the beam is gaussian with a maximum at the center of a circular shape.

The radiation beam 12 passes through the modulator 14, preferably an acousto-optical modulator. The modulated radiation beam 12' passes in turn through deflection means or scanner 16, which comprises two mirrors 20 and 22. Each mirror has an axis (not shown) allowing reflection of the beam to a free upper surface 46 of composition bath 40 in X and Y directions, the X and Y directions being perpendicular to each other and parallel to the free upper surface 46. Mirrors 20 and 22 may rotatably move around their corresponding axes by means of motors 24 and 26, respectively, for controllably deflecting the beam in a vector scanning mode, in the X and Y directions, towards predetermined positions of a photoformable composition bath 40 contained in a vessel 44 of the coating station 71. As the beam is deflected by the deflection means 16, it assumes an acceleration from zero level to a maximum acceleration, and a velocity from zero level to a maximum constant velocity. The velocity and intensity of the beam remain proportional to each other so that the exposure remains substantially constant. The beam 12" exposes preselected portions of the composition in the layer depositing zone to a substantially constant depth as described below.

For the purpose of this invention, the radiation beam 12" may be not only a focused beam from a laser, but also light from any other light source, modified in a number of different ways. For example, it may be transmitted through any type of variable optical density photomask such as a liquid crystal display, silver halide film, electro-deposited mask etc., or reflected off of any variable optical density device, such as a reflective liquid crystal cell. Also, the deflection means may be any other type of scanner, such as a raster scanner, for example.

The coating station 71 comprises a vessel or vat 44 for containing the liquid photoformable composition bath 40. A substantially flat platform 41 is disposed within the vessel 44 and adapted to be positioned as desired with respect to the free upper or top surface 46 of the composition bath 40. The platform 41 has sides, such as a left L and a right R side. A placement means 42 is provided for controllably varying the distance between the free top surface 46 of the composition bath 40 and platform surface 41' through a supporting arm 42'. Although placement means 42 is shown in FIG. 1 as being fully immersed in the composition 40, it should be understood that it may be positioned outside vessel 44, and connected to platform 41 either by passing the supporting arm 42' through a seal at the bottom of vessel 44, or preferably by using a bent supporting arm passing around the vessel 44 and through top surface 46 to be connected to and support the platform 41 in a known manner.

The invention includes a unique applicator 43 having a dispensing chamber means 58, 59 located between two barrier walls 73 and 73' to form fluid pumping chambers 43a and 43b. A first reserve supply volume includes two volume supply sectors defined by pumping chambers 43a and 43b each disposed on opposite sides of discharge or gravity feed means 43c. As applicator 43 moves across top surface 46, one of the pumping chambers 43a and 43b is ahead of discharge means 43c and the other chamber is behind discharge means 43c. Drive means 39 move applicator 43 back and forth to scan in two directions across the upper surface 46. Barrier walls 73 and 73' have bottom straight edges which produce a liquid layer 48 along the layer depositing zone on the platform surface 41 from liquid in the pumping chamber that is moving in tandem behind discharge means 43c. Pump means 23 maintains fluid flow from the first reserve supply volume outside the dispensing chamber 58, 59 and into the second reserve supply volume inside dispensing chamber 58, 59. As shown in FIG. 1, communication lines 52, 50, 54, 60, 62, and 63 are also provided for the computer 34 to control the radiation source 10, the modulator 14, the deflection means 16, the placement means 42, the applicator drive means 39, and the applicator pump means 23, respectively.

In operation, the radiation or photoenergy means 10 provides a radiation beam 12 having an intensity as aforementioned. The radiation beam 12 passes through modulator 14, where its intensity may be modulated from a zero intensity level to a maximum intensity level having a value less than that of the unmodulated beam intensity, due to energy losses. The modulated radiation beam 12', having somewhat decreased intensity due to losses, passes in turn through the deflection means 16 having a two-mirror 20 and 22 assembly, each mirror separately driven by a different motor 24 and 26, respectively. Mirror 20 deflects the beam in X direction, while mirror 22 deflects the beam in Y direction, the X direction being perpendicular to the Y direction.

Electrical feedback regarding the relative movements of the mirrors 20 and 22 is provided by the deflection means 16 to the computer 34 through line 54. This feedback is correctable to the velocity and average residence time of beam 12" on the predetermined portions of the thin deposited layer 48 and is processed by computer 34 and fed to modulation means 14 as a control command through line 50 to modulate the intensity of radiation beam 12. The product of the intensity of beam 12" and the average residence time at each position of the predetermined portions of deposited layer 48 thus remains substantially constant. The exposure level is the product of these two parameters and therefore remains substantially constant. By maintaining the exposure level constant over the predetermined portions of each successive contiguous thin layer, the thickness of the layers is also kept substantially constant.

The described correction or compensation is very important, especially at unsupported portions of the thin layers, where swollen edges will appear as a result of overexposure due to the low initial velocity at the edges in vector scanning. The higher the intensity of beam 12", or the higher the photosensitivity of the photoformable composition, the more severe this problem becomes in the absence of means to maintain the exposure level constant. Such exposure control is also necessary in raster scanning or in systems incorporating overscanned vector schemes, the difference being that the edges of the image may be underexposed due to lack of exposure contribution from adjacent non-exposed regions. In these cases, modulation means are utilized to ensure that edge regions of the image receive substantially the same exposure as none-edge regions. In any event, radiation beam 12" is controllably directed toward the photoformable composition bath 40.

Figure 5:
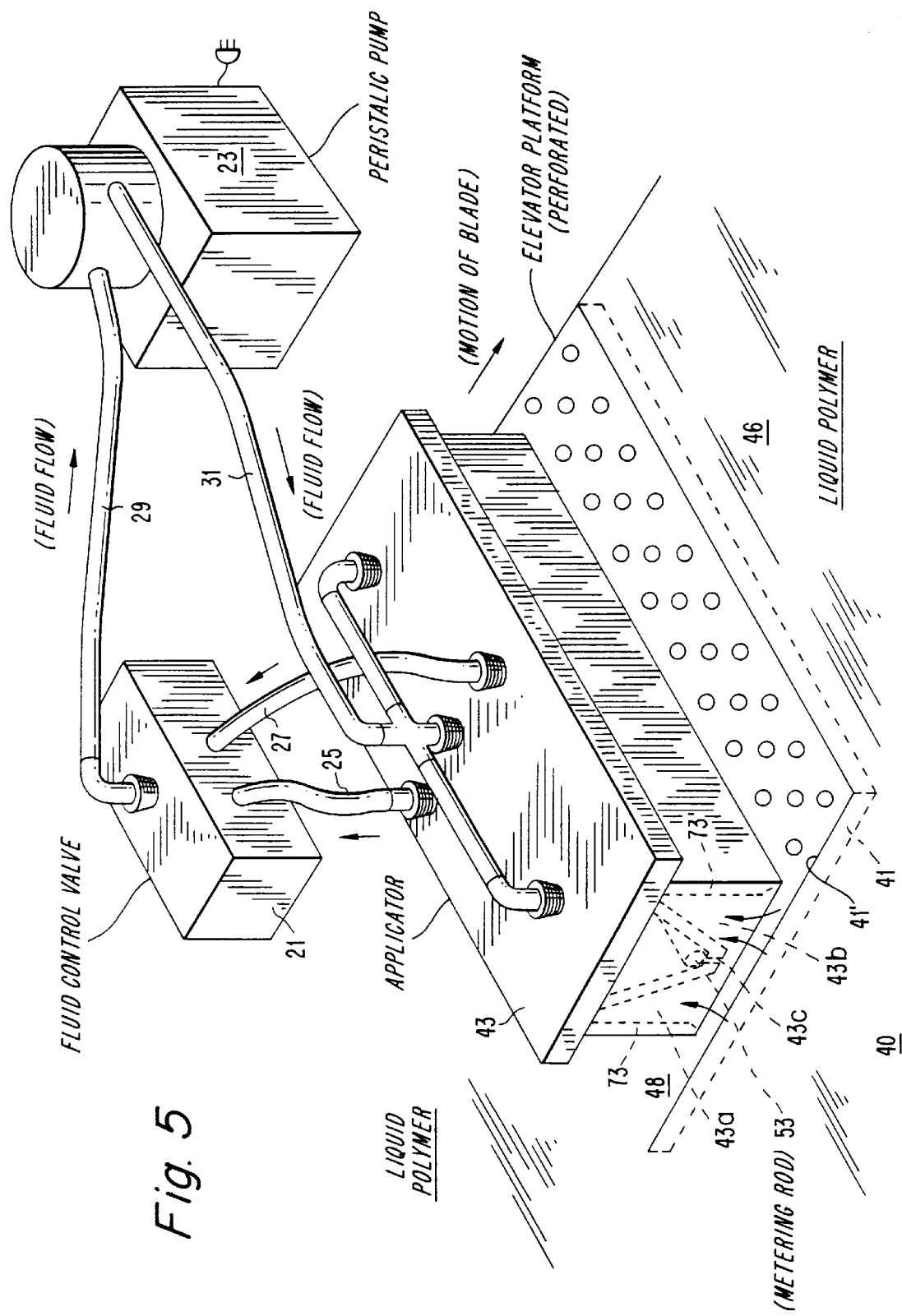
FIG. 5 is a diagrammatic perspective view of an applicator assembly of the invention.

Platform 41 has a substantially flat upper surface 41' and is initially positioned within vessel 44 so that flat upper surface 41' is coextensive with the top surface 46 of the composition bath 40 (FIG. 5). Applicator pump means 23 first pumps liquid medium upwardly into pumping chambers 43a and 43b and then into the dispensing chamber 58, 59, which holds enough fluid medium to deposit the desired liquid medium layer across the entire surface of bath 40. Once a recirculation flow of liquid medium is established through applicator 43, drive means 39 moves applicator 43 across vat 44 to form a deposited layer of liquid medium along the layer depositing zone on platform surface 41'. The photohardenable liquid medium in the deposited layer is then selectively exposed to photoenergy as described herein and a cross-sectional slice of the three-dimensional article is formed. Platform 41 is then lowered into the composition bath 40 by an amount equal to the thickness of the next deposited layer 48 while applicator 43 removes liquid medium from the surface 46 to maintain equilibrium. The level of upper surface 46 may be adjusted as necessary. Drive means 39 moves applicator 43 to scan across the vat and bath surface in the reverse direction to produce the next successive uniform liquid layer 48 on top of first hardened cross-section laminae. In FIG. 1, applicator 43 is shown adjacent the right side R of platform 40 where it remains for an amount of time sufficient to allow the liquid medium to reach equilibrium and the platform 41 to assume the desired depth relationship so that the last formed hardened cross-section is ready to receive the next layer thickness to be selectively hardened thereon.

The above steps are repeated until all contiguous layers are produced and the three-dimensional object is completed. All the above steps are coordinated by the computer 34 in a conventional manner.

In the present invention, the equilibrium level of free upper surface 46 always remains substantially constant regardless of the distance moved by platform 41. Once photoenergy forms the first hardened layer, part of bath 40 remains liquid but the total volume of liquid medium in the bath and circulating through applicator 43 remains constant. That is, the amount of photoformable composition 40 within vessel 44 remains the same because no additional composition 40 is added. The composition needed for successive layers 48 is circulated through applicator 43 above free surface 46 as describe herein. The equilibrium level of free surface 46 will always remain substantially the same, thereby ensuring that the distance between the deflection means 16 and upper free surface 46 remains substantially constant. It is critically important that this distance remain substantially constant so that laser beam 12" remains focused precisely at the surface 46 of the composition so as to achieve dimensionally accurate photoformed layers. Even though a typical photoformable composition 40 may change in volume upon polymerization by shrinking approximately one (1) percent, in practice such a change in volume is not significant and does not require any fine adjustments in the equilibrium level of the free surface 46 of the adding of additional composition 40, particularly when the mass of the object being fabricated is less than thirty (30) percent of the mass of the composition 40 in vessel 44. Usually, the mass of the fabricated part is between one (1) and five (5) percent of the mass of the composition in the vessel 44.

Du Pont's SOMOS™ solid imaging materials used in this invention and are sufficiently close to "ideal" such that no fine tuning of the equilibrium level of the free surface 46 is necessary during the fabrication process. It is also significant in the present invention that applicator 43 allows the level of the free surface 46 to be maintained while it moves across surface 46 and platform 41 because it creates no wave motion whatsoever in the composition surrounding the previously exposed layer. Thus, there is no disturbance of the previously exposed layer and particularly those parts of the exposed layer which are partially unsupported.

Applicator 43 pumps any entrapped air in the form of air bubbles in the liquid medium pumped into pumping chambers 43a and 43b. The continuity of the liquid dispensed as a curtain or extrusion sheet by applicator 43 may suffer interruptions and splitting if the distance between the dispenser 43 and the free surface 46 is high. This will depend, however, on the rheological characteristics of the photoformable composition in bath 40, the velocity of applicator 43 across vat 44, and other factors. It may be possible to dispense the liquid medium in other than the form of the sheet so long as it is substantially evenly distributed on the liquid layer depositing zone immediately ahead of the following liquid volume supply sector as described herein. The velocity of applicator 43 is in the range of about 500 mils to 1200 mils per second.

After the dispenser 43 has been raised, both the dispenser 43 and the doctor blade 73 move forward with the dispenser 43 leading and the doctor blade 73 following.

The main resin tank or vat 44 may be provided with a laser liquid level detector 15 to detect the liquid level of the liquid photosetting resin 40 in the main resin tank 44 for monitoring and controlling the liquid level. The laser liquid level detector 15 comprises a laser 19 and a line sensor 17. The liquid level of the liquid photosetting resin 40 is detected from the position of incidence on the line sensor 17 of a laser beam projected by laser 19 and reflected by surface 46 of the liquid photosetting resin bath 40. A liquid level control bar 18 partly immersed in the liquid photosetting resin bath 40 is raised or lowered according to a liquid level detection signal provided by the laser liquid detector 15 to regulate the liquid level upper surface 46 by varying the volume of the immersed portion of liquid level control bar 18.

The dispensing chamber means includes two downwardly directed wall sections 58 and 59 laterally spaced from each other and having a V-shape form by two converging bottom wall portions 58' and 59' with discharge or gravity feed means located between bottom wall portions 58' and 59'. The discharge means includes an elongated slot 43c and an elongated threaded rod member 53 disposed between the converging bottom wall portions 58' and 59' to direct a metered amount of liquid medium to discharge slot 43c located at the distal end of bottom wall portions 58' and 59'. Threaded rod 53 constitutes a metering device directly above the applicator slot 43c to adjust the volumetric flow rate through the slot. The unique problem on metering the flow across a horizontal slot is overcome by either using a tension spring or threaded rod to allow predesignated flows. The flow is determined by the size of the grooves between the threads or the size of the spacings between the spring coils as it is expanded by tension on the spring coil. Slot 43c has a width of from about 30 to 50 mils. Rod 53 has a diameter of 5/16 of an inch and has 24 threads per inch along its entire length. A first reserve supply volume is located in suction or pumping chambers 43a and 43b which define two volume supply sectors on opposite sides of the dispensing chamber defined by wall sections 58 and 59.

The second reserve supply volume is in the dispensing chamber located between two downwardly directed wall sections 58 and 59. When applicator 43 moves in a lineal direction, the first reserve supply volume defines a forward volume supply sector located ahead of slot 43c, and a following volume supply sector located to the rear of the dispensing chamber means 58, 59. The following volume supply sector provides liquid medium for forming a layer 48 having a predetermined thickness within the layer depositing zone over platform surface 41' when drive means 39 moves applicator 43 in a lineal direction across the upper surface of the liquid medium bath 40.

As shown in FIGS. 2–4, applicator 43 includes connecting apertures 45 for coupling applicator 43 to drive means 39 which move applicator 43 in a single plane back and forth across the upper surface 46 of liquid medium bath 40. After each scan of surface 46 by applicator 43, platform 41 is moved downwardly a thickness of the next cross-sectional slice to be formed. Upper surface 46 is maintained at a constant level through the use of the liquid level control mechanism 15, 17, 18, 19, and the establishment of an equilibrium in the pumping circulation flow of liquid through the applicator assembly 21, 23, 43.

Pumping chamber 43a is formed between barrier wall 73 and dispensing chamber wall 58 and pumping chamber 43b is formed between barrier wall 73' and dispensing chamber wall 59. Elongated threaded member 53 extends the entire length of applicator 43 and is held in place between converging wall sections 58' and 59' by a plurality of ribbed members 57 extending between wall portions 58' and 59' as shown. The dispensing chamber includes an end wall portion 56 having an overflow opening 55 to limit the amount of liquid medium to be maintained within the dispensing chamber. In this embodiment, the dispensing chamber contains an amount of liquid medium that is sufficient to apply a layer of liquid medium having a thickness of 5 to 6 mils across the entire surface of vat 44. In this embodiment, the vat has a rectangular cross section of about 22 inches by 24 inches.

The discharging means includes an elongated discharge slot 43c and metering rod 53. The slot has a width B of from 30 to 50 mils and the bottom of the converging wall portions 58' and 59' are at a distance A above the bottom portion 61 and 61' in an amount sufficient to provide a continuous supply of liquid medium into chambers 43a and 43b. The discharge supply of liquid medium will maintain the first reserve supply volume within the following pumping chamber and eliminate problems associated with the loss of suction in a leading volume supply sector as applicator 43 moves across the layer depositing zone over platform surface 41'. In this embodiment, distance A is about 40 mils.

To form the first layer on platform 41, platform surface 41' is adjusted to be coextensive with upper surface 46 of liquid medium bath 40 (FIGS. 2, 4, and 5). When an air gap forms in the leading pumping chamber because platform surface 41' is downwardly spaced from the bottom of barrier wall 73' when moving in a direction from left to right and at the bottom of barrier 73 when moving from right to left as shown in FIGS. 6B and 6C. The straight edge bottom portions 61 and 61' are disposed upwardly from the platform surface 41' by amount sufficient to form the desired deposited layer 48. In this particular embodiment, the distance is about 5 to 6 mils to form the thickness of the layer 48 from the volume of liquid that is maintained in the pumping chamber following the discharge of liquid medium from elongated slot 43c as applicator 43 moves over along the layer depositing zone across platform surface 41'.

Peristaltic pump 23 establishes a recirculating flow of liquid medium from bath 40 into applicator 43 through fluid control valve 21 by way of flexible tubes 25 and 27 connected to applicator outlets 49 and 47, respectively. Control valve 21 directs a liquid medium and/or air along tubing 29 to pump 23 which circulates the fluid medium through conduit 31 into dispensing chamber inlet 51 into the dispensing chamber to complete the flow of liquid medium through applicator 43.

Fluid control valve 21 may include either a single valve member such as the single ball shown in FIGS. 6A–6C or two valve members as shown in the embodiment of FIG. 7A–7C. In the single valve member embodiment, the theoretical operation of the single ball member maintains the ball in a floating condition as applicator 43 moves across upper surface 46. Liquid medium thus is pumped upwardly from the bath 40 through both pumping chambers 43a and 43b. As applicator 43 moves across the layer depositing zone on platform surface 41 and across previously hardened cross-sectional slices, the leading pumping chamber will lose its suction and begin to draw air through dispenser 43. Because air moves more rapidly than liquid, the ball member will tend to close the outlet from the following chamber. The ball is shown in a completely closed position but it is also possible that the liquid will continue to flow at a lower rate and mix with the air to produce a mixture of fluids in conduit 29 to pump 23. The situation simply reverses when applicator 43 scans in the reverse direction as shown in FIGS. 6C.

The same type of condition exists in the embodiment having two valve members. When air is pumped instead of liquid, the tendency will be for the air to move more easily through one of the valve members while the other member moves to a closed position. An equilibrium condition may be formed so that the liquid volume in the following chamber will not be lost to maintain substantially quiescent condition as layer 48 is formed from beneath the bottom straight edge that is following at the rear side of applicator 43 as it moves across bath surface 46. Other types of valve members such as a flat or duckbill member may be used to control the flow from pumping chambers 43a and 43b as conditions change as applicator 43 scans vat surface 46 and the layer depositing zone over platform surface 41'.

Figure 8:
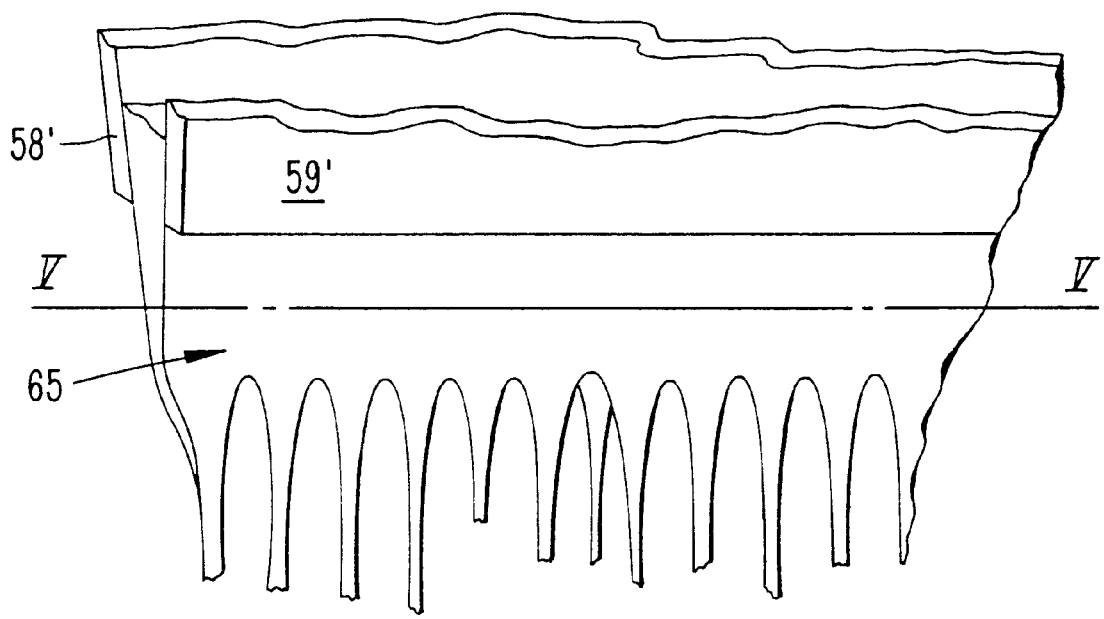
FIG. 8 is a fragmentary perspective view of the applicator device of the invention discharging liquid medium in a specific embodiment.

In the specific embodiment of FIG. 8, a continuous sheet of liquid medium 65 is formed as it is discharged through elongated slot 43c between converging wall portions 58' and 59'. Applicator 43 is designed to have the continuous sheet of liquid material deposited along the layer depositing zone within a plane through line V—V and normal to the flow of liquid medium from slot 43c. The disposition of slot 43c at such a height above the layer depositing zone avoids the natural occurring strands of liquid medium as shown from being formed before the liquid medium is deposited. By maintaining the distance A (FIG. 4), the disposition of a continuous sheet of liquid medium is insured as applicator 43 moves across the layer depositing zone. Viscosity control is important to maintain the desired sheet of liquid medium flow from gravity feed slot 43c. In the specific embodiment of the invention, the viscosity of the liquid medium is controlled by maintaining the bath temperature in the range of about 74° F. to about 80° F. in any known manner. Heating and temperature sensing apparatus such as found in U.S. Pat. No. 5,248,249 may be used, for example.

While the STEREOLITHOGRAPHY LAYERING CONTROL SYSTEM has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A stereolithography system for rapidforming a three-dimensional object by successively depositing a plurality of contiguously disposed layers of photohardenable liquid medium along a layer depositing zone wherein a cross-sectional slice of said object is selectively hardened in each successive layer to build the desired object, said system comprising:

a) a vat containing a bath of photohardenable liquid medium having an upper surface extending across the vat, b) platform means mounted in the vat to provide surface means for supporting the object being formed within said layer depositing zone, c) reservoir means for providing above said bath a liquid medium reserve supply including first and second reserve supply volumes for forming each successive layer, d) liquid medium furnishing means for directing liquid medium upwardly from said upper surface into said reserve supply volume for providing liquid medium for said second reserve supply volume, e) said first reservoir means including feed means for delivering said second reserve supply volume to said bath from a location upwardly spaced from said upper surface, f) drive means for moving said reservoir means across the upper surface of said liquid medium bath, g) layer forming means mounted to said reservoir means and upwardly spaced from said platform means by an amount sufficient to produce each successive layer when said drive means moves the reservoir means across said layer depositing zone, and h) photo energy means for selectively hardening each successive layer of said liquid medium deposited from said reserve supply to form a solidified cross-section of the object being formed.

2. A system as defined in claim 1 wherein said first reserve supply volume includes a following supply sector located to the rear of said feed means to supply liquid medium for forming a layer having a predetermined thickness within said layer depositing zone when the drive means moves the reservoir means in a lineal direction across the upper surface of the liquid medium bath.

3. A stereolithography system for rapidforming a three-dimensional object by successively depositing a plurality of contiguously disposed layers of photohardenable liquid medium along a layer depositing zone wherein a cross-sectional slice of said object is selectively hardened in each successive layer to build the desired object, said system comprising:

19 a) a vat containing a bath of photohardenable liquid medium having an upper surface extending across the vat, b) platform means mounted in the vat to provide surface means for supporting the object being formed within said layer depositing zone, c) reservoir means for providing above said bath a reserve supply of said liquid medium for forming each successive layer, d) liquid medium furnishing means for directing liquid medium into said reserve supply of said reservoir means, e) said reservoir means including containing means providing a first reserve supply volume projecting upwardly from said upper surface and feed means for delivering a second reserve supply volume to said bath from a location upwardly spaced from said upper surface, f) drive means for moving said reservoir means across the upper surface of said liquid medium bath, g) layer forming means mounted to said reservoir means and upwardly spaced from said platform means by an amount sufficient to produce each successive layer when said drive means moves the reservoir means across said layer depositing zone, h) photo energy means for selectively hardening each successive layer of said liquid medium deposited from said reserve supply to form a solidified cross-section of the object being formed, i) said first reserve supply volume defines a following supply sector located to the rear of said feed means to supply liquid medium for forming a layer having a predetermined thickness within said layer depositing zone when the drive means moves the reservoir means in a lineal direction across the upper surface of the liquid medium bath, and j) said first reserve supply volume defines a forward volume supply sector located ahead of said feed means when the reservoir means moves in said lineal direction.

4. A stereolithography system for rapidforming a three-dimensional object by successively depositing a plurality of contiguously disposed layers of photohardenable liquid medium along a layer depositing zone wherein a cross-sectional slice of said object is selectively hardened in each successive layer to build the desired object, said system comprising:

a) a vat containing a bath of photohardenable liquid medium having an upper surface extending across the vat, b) platform means mounted in the vat to provide surface means for supporting the object being formed within said layer depositing zone, c) reservoir means for providing above said bath a reserve supply of said liquid medium for forming each successive layer, d) liquid medium furnishing means for directing liquid medium into said reserve supply of said reservoir means, e) said reservoir means including containing means providing a first reserve supply volume projecting upwardly from said upper surface and feed means for delivering a second reserve supply volume to said bath from a location upwardly spaced from said upper surface,

20 f) drive means for moving said reservoir means across the upper surface of said liquid medium bath, g) layer forming means mounted to said reservoir means and upwardly spaced from said platform means by an amount sufficient to produce each successive layer when said drive means moves the reservoir means across said layer depositing zone, h) photo energy means for selectively hardening each successive layer of said liquid medium deposited from said reserve supply to form a solidified cross-section of the object being formed, i) said first reserve supply volume includes a first volume supply sector located on one side of said feed means and a second volume supply sector located on the other side of said feed means, and j) one of said volume supply sectors is ahead of said feed means and the other volume supply sector is behind said feed means when the drive means moves the reservoir means in a lineal direction across the upper surface of the liquid medium bath.

5. A system as defined in claim 1 wherein said liquid medium furnishing means includes fluid passageway means and pump means for directing liquid medium upwardly from the upper surface of said liquid medium bath through said fluid passageway means into said first reserve supply volume and from there into said and second reserve supply volume.

6. A system as defined in claim 4 wherein said liquid medium furnishing means includes pump means, fluid passageway means, and valve means located in said fluid passageway means for controlling a flow of liquid that said pump means directs through said fluid passageway means between said first and second volume supply sectors and said second reserve supply volume.

7. A system as defined in claim 6 wherein said valve means being effective to allow the pump means to draw air through one of the volume supply sectors when it is ahead of said feed means and passes over the last previously hardened cross-sectional slice formed in said layer depositing zone, said valve means being further effective to hold liquid medium in the other volume supply sector when it is behind said feed means and said pump means draws air through said leading volume supply sector.

8. A system as defined in claim 7 wherein said valve means includes two valve inlet openings defined by respective inlet opening structures, a single valve outlet opening defined by an outlet opening structure, and closure means for controlling liquid medium flow through said valve means into said two inlet openings and out said single outlet opening to said pump means, said pump means being effective to direct liquid medium through said fluid passageway means into said second reserve supply volume.

9. A system as defined in claim 8 wherein said closure means includes valve element means disposed to operate between an open position and a closed position with respect to each of said valve inlet openings, said valve element means being effective to maintain said inlet and outlet openings in an open position when liquid medium is directed though said valve means and effective to close said inlet opening to hold said volume supply sector in place behind said feed means when air is directed through the other of the inlet openings connected to the volume supply sector ahead of said feed means.

10. A system as defined in claim 8 wherein said closure means includes a single ball element and means to keep said ball element in a floating position away from said inlet and outlet openings when liquid medium is directed through said valve means but in a closed position over one of the inlet openings connected to the volume supply sector behind said feed means when air is directed through the other of the inlet openings connected to the volume supply sector ahead of said feed means.

11. A system as defined in claim 10 wherein said valve element means includes a separate ball element mounted to float between said open position and said closed position in each of said inlet opening structures.

12. In a stereolithography system for rapidforming a three-dimensional object by successively depositing a plurality of contiguously disposed layers along a layer depositing zone wherein a cross-sectional slice of said object is formed in each layer to build the desired object, said system including a vat containing a bath of liquid medium having an upper surface extending across the vat and being hardenable upon exposure to photo-energy, platform means in said vat to support the object being formed, and photo-energy providing means for selectively hardening each successive deposited layer to form a solidified cross-section of the object, a liquid medium applicator assembly comprising:

a) housing means including reservoir means for providing a liquid medium reserve supply including first and second reserve supply volumes above the upper surface of said liquid medium bath, b) said reservoir means including means for directing liquid medium from said upper surface to said first reserve supply volume which projects upwardly from said upper surface and from there to said second reserve supply volume and then including dispensing means for delivering liquid medium from said second reserve supply volume to said bath from a location upwardly spaced from said upper surface, c) drive means for moving said reservoir means across the upper surface of said liquid medium bath, and d) layer forming means being mounted to said reservoir means and upwardly spaced from said platform means an amount sufficient to produce each successive layer from said first reserve supply volume when said drive means moves the reservoir means across said layer depositing zone.

13. An applicator assembly as defined in claim 12 wherein said dispensing means includes dispensing chamber means for holding said second reserve supply volume and having discharge means for dispensing a substantially uniform discharge supply of liquid medium from the dispensing chamber means, said reservoir means includes downwardly extending solid barrier means for defining said first reserve supply volume between said barrier means and said dispensing chamber means, and said layer forming means includes a straight edge section located at the bottom of said barrier means and reaching across said layer depositing zone and being upwardly spaced from said platform means to deposit a liquid medium layer from said first reserve supply volume over said layer depositing zone.

14. In a stereolithography system for rapidforming a three-dimensional object by successively depositing a plurality of contiguously disposed layers along a layer depositing zone wherein a cross-sectional slice of said object is formed in each layer to build the desired object, said system including a vat containing a bath of liquid medium having an upper surface extending across the vat and being hardenable upon exposure to photo-energy, platform means in said vat to support the object being formed, and photo-energy providing means for selectively hardening each successive deposited layer to form a solidified cross-section of the object, a liquid medium applicator assembly comprising:

a) housing means including reservoir means for providing a liquid medium reserve supply above the upper surface of said liquid medium bath, b) said reservoir means including containing means providing a first reserve supply volume projecting upwardly from said upper surface and dispensing means for delivering a second reserve supply volume to said bath from a location upwardly spaced from said upper surface, c) drive means for moving said reservoir means across the upper surface of said liquid medium bath, and d) layer forming means being mounted to said reservoir means and upwardly spaced from said platform means an amount sufficient to produce each successive layer from said first reserve supply volume when said drive means moves the reservoir means across said layer depositing zone, e) said dispensing means includes dispensing chamber means for holding said second reserve supply volume and having discharge means for dispensing a substantially uniform discharge supply of liquid medium from the dispensing chamber means, f) said containing means includes downwardly extending solid barrier means for defining said first reserve supply volume between said barrier means and said dispensing chamber means, and g) said layer forming means includes a straight edge section located at the bottom of said barrier means and reaching across said layer depositing zone and being upwardly spaced from said platform means to deposit a liquid medium layer from said first reserve supply volume over said layer depositing zone, h) said solid barrier means includes a downwardly extending barrier wall laterally disposed on each side of said dispensing chamber means, i) said first reserve supply volume includes a first volume supply sector located on one side of said discharge means between a first barrier wall and said dispensing chamber means and a second volume supply sector located on the other side of said discharge means between a second barrier wall and said dispensing chamber means, j) one of said volume supply sectors being a leading supply sector located ahead of said discharge means and the other said volume supply sector being a following supply sector located behind said discharge means when the drive means moves the reservoir means in a lineal direction across the upper surface of the liquid medium bath.

15. An applicator assembly as defined in claim 14 wherein said discharge means is effective to substantially uniformly deposit a sheet of liquid medium along said layer depositing zone to produce a continuous supply of liquid medium which flows from said second reserve supply volume, and said bottom straight edge section forms each said layer from said following supply sector.

16. An applicator assembly as defined in claim 15 further including liquid medium furnishing means for directing liquid medium from said first reserve supply volume to said second reserve supply volume, said liquid medium furnishing means includes fluid passageway means and pump means for directing liquid medium from said liquid medium bath through said fluid passageway means into said first and second reserve supply volumes.

17. An applicator assembly as defined in claim 13 wherein said discharge means includes gravity feed means and metering means for directing a substantially uniform discharge supply of liquid medium from the dispensing chamber means to said feed means.

18. An applicator assembly as defined in claim 13 wherein said dispensing chamber means includes two downwardly directed wall sections laterally spaced from each other and having two converging bottom wall portions with said discharge means being located between said bottom wall portions, said second reserve supply volume being located between said two downwardly directed wall sections, and said first reserve supply volume includes a following supply sector located to the rear of said dispensing chamber means from which supply sector liquid medium is supplied to form a layer having a predetermined thickness within said layer depositing zone when the drive means moves the reservoir means in a lineal direction across the upper surface of the liquid medium bath.

19. An applicator assembly as defined in claim 18 wherein said first reserve supply volume includes a forward supply sector located ahead of said feed means when the reservoir means moves in said lineal direction.

20. In a stereolithography system for rapidforming a three-dimensional object by successively depositing a plurality of contiguously disposed layers along a layer depositing zone wherein a cross-sectional slice of said object is formed in each layer to build the desired object, said system including a vat containing a bath of liquid medium having an upper surface extending across the vat and being hardenable upon exposure to photo-energy, platform means in said vat to support the object being formed, and photo-energy providing means for selectively hardening each successive deposited layer to form a solidified cross-section of the object, a liquid medium applicator assembly comprising:

a) housing means including reservoir means for providing a liquid medium reserve supply above the upper surface of said liquid medium bath, b) said reservoir means including containing means providing a first reserve supply volume projecting upwardly from said upper surface and dispensing means for delivering a second reserve supply volume to said bath from a location upwardly spaced from said upper surface, c) drive means for moving said reservoir means across the upper surface of said liquid medium bath, and d) layer forming means being mounted to said reservoir means and upwardly spaced from said platform means an amount sufficient to produce each successive layer from said first reserve supply volume when said drive means moves the reservoir means across said layer depositing zone, e) said dispensing means includes dispensing chamber means for holding said second reserve supply volume and having discharge means for dispensing a substantially uniform discharge supply of liquid medium from the dispensing chamber means, f) said containing means includes downwardly extending solid barrier means for defining said first reserve supplies volume between said barrier means and said dispensing chamber means, and g) said layer forming means includes a straight edge section located at the bottom of said barrier means and reaching across said layer depositing zone and being upwardly spaced from said platform means to deposit a liquid medium layer from said first reserve supply volume over said layer depositing zone, h) said dispensing chamber means includes two downwardly directed wall sections laterally spaced from each other and having two converging bottom wall portions with said discharge means being located between said bottom wall portions, i) said second reserve supply volume being located between said two downwardly directed wall sections, and j) said first reserve supply volume defines a following supply sector located to the rear of said dispensing chamber means from which supply sector liquid medium is supplied to form a layer having a predetermined thickness within said layer depositing zone when the drive means moves the reservoir means in a lineal direction across the upper surface of the liquid medium bath, k) said discharge means includes an elongated threaded rod member disposed between the converging bottom wall portions to direct a metered amount of liquid medium to discharge outlet means located at the distal end of said bottom wall portions.

* * * * *

US005922364C1

(12) REEXAMINATION CERTIFICATE (4712nd)
United States Patent
Young, Jr.

(10) Number: US 5,922,364 C1
(45) Certificate Issued: Jan. 7, 2003

(54) STEREOLITHOGRAPHY LAYERING CONTROL SYSTEM

(75) Inventor: Albert C. Young, Jr., Falls Church, VA (US)

(73) Assignee: Aaroflex, Inc., Fairfax, VA (US)

Reexamination Request:
No. 90/005,893, Dec. 21, 2000

Reexamination Certificate for:
Patent No.: 5,922,364
Issued: Jul. 13, 1999
Appl. No.: 08/810,285
Filed: Mar. 3, 1997

(21) Appl. No.: 08/810,285
(51) Int. Cl.[7] .................. B29C 35/08; B29C 41/02
(52) U.S. Cl. .................. 425/174.4; 264/401
(58) Field of Search .................. 425/174.4; 264/401

(56) References Cited

U.S. PATENT DOCUMENTS

| 5,248,249 A | * | 9/1993 | Yamamoto et al. | 425/174.4 |
| 5,263,130 A | * | 11/1993 | Pomerantz et al. | 264/401 |
| 5,474,719 A | * | 12/1995 | Fan et al. | 264/401 |
| 5,626,919 A | * | 5/1997 | Chapman et al. | 425/174.4 |
| 5,647,931 A | * | 7/1997 | Retallick et al. | 425/174.4 |
| 5,665,401 A | * | 9/1997 | Serbin et al. | 425/174.4 |
| 5,667,820 A | * | 9/1997 | Heller et al. | 425/174.4 |
| 5,902,537 A |   | 5/1999 | Almquist et al. | 425/135 |

OTHER PUBLICATIONS

CAD/CAM Publishing, Inc., "Rapid Prototyping Report," Feb. 1996, vol. 6, No. 2.
CAD/CAM Publishing, Inc., "Rapid Prototyping Report," Apr. 1996, vol. 6, No. 4.

* cited by examiner

*Primary Examiner*—Timothy W. Heitbrink

(57) ABSTRACT

An apparatus and method for depositing a layer of liquid medium along an upper surface of a liquid medium bath. A first reserve supply volume projecting upwardly from said surface and a continuous sheet of discharged liquid medium are provided above a working zone along said surface. The discharged liquid medium sheet is substantially uniformly deposited to produce a continuous supply of liquid medium and to add liquid medium to the first reserve supply volume as the continuous sheet moves along the upper bath surface. A liquid medium layer having a preselected thickness is formed with liquid medium flowing from said first reserve supply volume of liquid medium. An applicator assembly includes an applicator device and a pumping assembly to produce the reserve supply volume from a liquid medium bath.

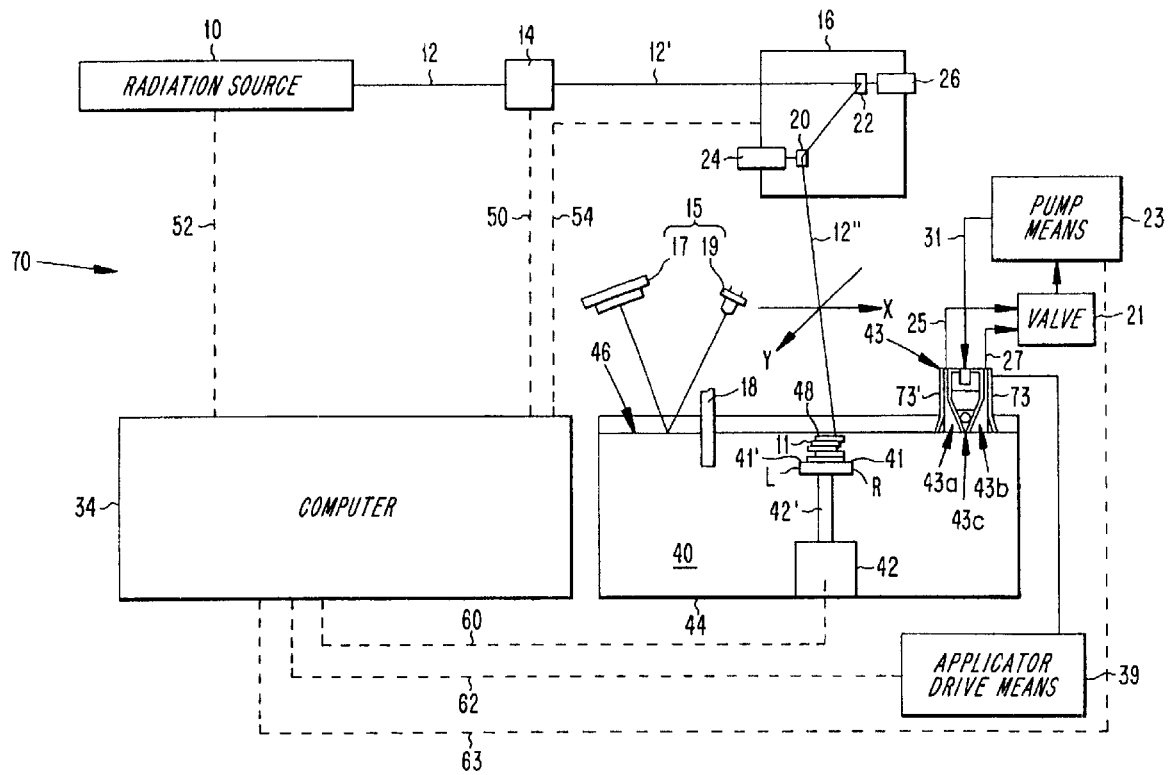

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 16, lines 33–60:

Pumping chamber 43a is formed between barrier wall 73 and dispensing chamber wall 58 and pumping chamber 43b is formed between barrier wall 73' and dispensing chamber wall 59. *The first reserve supply volume of pumping chambers 43a and 43b has a leading volume supply sector and a following volume supply sector, and liquid medium is drawn from the working surface of the liquid medium in vat 44 as shown in FIGS. 6A and 7A while both barrier walls 73 and 73' are in contact with the liquid medium working surface.* Elongated threaded member 53 extends the entire length of applicator 43 and is held in place between converging wall sections 58' and 59' by a plurality of ribbed members 57 extending between wall portions 58' and 59' as shown. The dispensing chamber includes an end wall portion 56 having an overflow opening 55 to limit the amount of liquid medium to be maintained within the dispensing chamber. In this embodiment, the dispensing chamber contains an amount of liquid medium that is sufficient to apply a layer of liquid medium having a thickness of 5 to 6 mils across the entire surface of vat 44. In this embodiment, the vat has a rectangular cross section of about 22 inches by 24 inches.

The discharging means includes an elongated discharge slot 43c and metering rod 53. The slot has a width B of from 30 to 50 mils and the bottom of the converging wall portions 58' and 59' are at a distance A above the bottom portion 61 and 61' in an amount sufficient to provide a continuous supply of liquid medium into chambers 43a and 43b. The discharge supply of liquid medium will maintain the first reserve supply volume within the following pumping chamber and eliminate problems associated with the loss of suction [in] *when, as shown in FIGS. 6B–6C and 7B–7C, air moves into* a leading volume supply sector as applicator 43 moves *the leading supply sector over a previously formed solidified cross-section of the solid part as applicator 43 moves* across the layer depositing zone over platform surface 41'. In this embodiment, distance A is about 40 mils.

AS A RESULT OF REEXAMINATION, IT HAS BEEN DETERMINED THAT:

The patentability of claims 3, 4, 6–11, 14–16 and 20 is confirmed.

Claims 1, 2, 12 and 13 are determined to be patentable as amended.

Claims 5, 17, 18 and 19, dependent on an amended claim, are determined to be patentable.

1. A stereolithography system for rapidforming a three-dimensional object by successively depositing a plurality of contiguously disposed layers of photohardenable liquid medium along a layer depositing zone wherein a cross-sectional slice of said object is selectively hardened *to form a solidified cross-section of the desired object* in each successive layer to build [the] *said* desired object, said system comprising:

a) a vat containing a bath of photohardenable liquid medium having an upper surface extending across the vat, b) platform means mounted in the vat to provide surface means for supporting the object being formed within said layer depositing zone, c) reservoir *forming* means for providing above said bath a liquid medium reserve supply including first and second reserve supply volumes *of said liquid medium reserve supply* for forming each successive layer, *said reservoir forming means including first and second chamber means for drawing liquid upwardly and directly from said upper surface into said chamber means to provide said liquid medium reserve supply,* d) liquid medium furnishing means [for directing] *connected to said reservoir forming means to direct said* liquid medium upwardly from said upper surface *from said first and second chamber means* into *said second reserve supply volume, and including means for maintaining said first* reserve supply volume *in one of said chamber means while drawing air into said other chamber means when said other chamber means is disposed above a previously formed solidified cross-section,* e) *said liquid medium furnishing means including means for providing liquid medium for said second reserve supply volume,*

[e] *f)* said [first] reservoir *forming* means including [feed] *dispensing* means for delivering *liquid medium from said second reserve supply volume to* the upper surface *of* said bath from a location upwardly spaced from said upper surface,

[f] *g)* drive means for moving said reservoir *forming* means across the upper surface of said liquid medium bath,

[g] *h) said reservoir forming means including* layer forming means [mounted to said reservoir means and] upwardly spaced from said [platform means] *upper surface* by an amount sufficient to produce each successive layer when said drive means moves the reservoir means across said layer depositing zone, and

[h] *i)* photo energy means for selectively hardening each successive layer of said liquid medium deposited from said reserve supply to form a solidified cross-section of the object being formed.

2. A system as defined in claim 1 wherein said first reserve supply volume includes a *leading supply sector and a* following supply sector *each said sector being defined by one of said chamber means, said leading supply sector being located ahead of said dispensing means to receive said air, and said following supply sector being* located to the rear of said [feed] *dispensing* means to supply liquid medium for forming a layer having a predetermined thickness within said layer depositing zone when the drive means moves the reservoir *forming* means in a lineal direction across the upper surface of the liquid medium bath.

12. In a stereolithography system for rapidforming a three-dimensional object by successively depositing a plurality of contiguously disposed layers along a layer depositing zone wherein a cross-sectional slice of said object is formed in each layer to build the desired object, said system including a vat containing a bath of liquid medium having an upper surface extending across the vat and being hardenable upon exposure to photo-energy, platform means in said vat to support the object being formed, and photo-energy providing means for selectively hardening each successive deposited layer to form a solidified cross-section of the object, a liquid medium applicator assembly comprising:

a) housing means including reservoir *forming* means for providing a liquid medium reserve supply including first and second reserve supply volumes *of said liquid medium* above the upper surface of said liquid medium bath, b) *means connected to* said reservoir *forming* means [including means] for directing liquid medium from said upper surface to said first reserve supply volume [which] *and into said second reserve supply volume,* c) *said first reserve supply volume including a leading supply sector and a following supply sector, and* projects upwardly from said upper surface [and from there to said second reserve supply volume and then] *while drawing air into said reservoir forming means through said leading supply sector when leading supply sector is disposed above a previously formed solidified cross-section,* d) *said reservoir forming means* including dispensing means for delivering liquid medium from said second reserve supply volume to *the upper surface of* said bath from a location upwardly spaced from said upper surface,

[c] *e)* drive means for moving said [reservoir] *housing* means across the upper surface of said liquid medium bath, and

[d] *f)* layer forming means being mounted to said [reservoir] *housing* means and upwardly spaced from said [platform means] *upper surface* an amount sufficient to produce each successive layer from said first reserve supply volume when said drive means moves the [reservoir] *housing* means across said layer depositing zone.

13. An applicator assembly as defined in claim 12 wherein said dispensing means includes dispensing chamber means for holding said second reserve supply volume and having discharge means for dispensing a substantially uniform discharge supply of liquid medium from the dispensing chamber means, said [reservoir] *housing* means includes downwardly extending solid barrier means for defining said first reserve supply volume between said barrier means and said dispensing chamber means, and said layer forming means includes a straight edge section located at the bottom of said barrier means and reaching across said layer depositing zone and being upwardly spaced from said [platform means] *upper surface* to deposit a liquid medium layer from said first reserve supply volume over said layer depositing zone.

* * * * *